United States Patent [19]

Aaron et al.

[11] 4,345,147

[45] Aug. 17, 1982

[54] VEHICLE MOUNTED MOBILE BUSINESS DATA HANDLING SYSTEM

[75] Inventors: Robert L. Aaron, Torrance, Calif.; Eugene F. Murphy, Ho Ho Kus, N.J.

[73] Assignee: International Telephone and Telegraph Corporation, New York, N.Y.

[21] Appl. No.: 206,783

[22] Filed: Nov. 14, 1980

[51] Int. Cl.³ .................. G06F 15/02; G06K 7/14
[52] U.S. Cl. .................................. 235/385; 364/708
[58] Field of Search .................. 364/519, 707–710; 235/385; 340/811, 870.16, 311

[56] References Cited

U.S. PATENT DOCUMENTS

| | | | |
|---|---|---|---|
| 3,876,863 | 4/1975 | Boone | 235/385 |
| 4,005,412 | 1/1977 | Leander | 340/811 |
| 4,038,535 | 7/1977 | Aldridge et al. | 364/710 |
| 4,188,618 | 2/1980 | Weisbart | 340/870.16 |

Primary Examiner—Thomas A. Robinson
Attorney, Agent, or Firm—John T. O'Halloran; David M. Quinlan

[57] ABSTRACT

The system includes a portable data entry and storage device for gathering and storing data with a containing rack for the portable data device to be attached to an inside wall of a vehicle. The portable data device and the rack have mating connectors which are automatically connected when the portable data device is inserted into the rack to supply power from the vehicle power supply system to the portable data device.

12 Claims, 21 Drawing Figures

VEHICLE MOUNTED MOBILE BUSINESS DATA HANDLING SYSTEM

The present invention relates to portable data handling systems which are particularly useful in delivery trucks for the delivery of commodities such as food products.

BACKGROUND OF THE INVENTION

In connection with the delivery of some products, and especially food products such as baked goods having a very limited shelf life, frequent deliveries must be made to the same groceries or other retain outlets from the bakeries by the bakery truck. There is often a considerable diversity of products to be delivered by the single bakery delivery truck. Also, frequent deliveries must be made because of the perishability and limited shelf life of the products, and returns of stale goods must be gathered and counted and taken back to the bakery. Because of all of these complications, a considerable time is consumed by the deliveryman, not only in carrying the products into the retail outlet and carrying the returns back out to the truck, but also in recording all of the details of these transactions. The time required for these record keeping activities seriously slows down the process of delivery, tying up both the driver and the equipment. Furthermore, the accuracy of the recordation of these transactions is very important in order to maintain good customer relations and in order to avoid losses.

Accordingly, it is an object of the present invention to provide a vehicle mounted mobile business data handling system which conveniently takes care of many of the record keeping problems of deliverymen such as bakery deliverymen, saving deliverymen's time and improving the accuracy of their records.

Another problem in connection with the operation of delivery trucks and in the record keeping function of bakery deliverymen-salesmen is the need for generating an accurate and highly legible written memorandum (invoice or consignment memorandum) to the customer at the time of sale or delivery.

Accordingly, it is another object of the invention to provide a system which includes means for generating a printed memorandum.

Another problem in connection with operations as outlined above is that if a data entry and storage device for gathering and storing data is used for the purpose of realizing the above mentioned objectives, it should be highly portable so that it need not remain in the delivery truck, and can be carried into the customer's premises for the entry of data on those premises. However, under such circumstances, a portable self-contained battery power system may have insufficient power to carry through the entire day of continuous use.

Accordingly, it is another object of the present invention to provide means for safely carrying a portable data entry and storage device within a delivery vehicle and for recharging the data device at the same time.

Other objects and advantages of the invention will be apparent from the following description and the accompanying drawings.

SUMMARY OF THE INVENTION

In carrying out the above objects of the invention there is provided a mobile business data handling system adapted to be mounted in a motor vehicle comprising a portable data entry and storage device for gathering and storing data and having a self-contained rechargeable battery power source, a containing rack defining a cavity for said portable data device, said rack being adapted to be attached to an inside vertical wall of said vehicle, said portable data device being insertable and removable from said rack, said portable data device and said rack having mating quick-disconnect connectors respectively arranged at an edge of said portable data device and at the inner-most surface of said rack cavity for automatic connection and disconnection of said connectors as said portable data device is inserted and removed from said rack, said connector in said rack cavity being arranged for connection to the vehicle power system to supply power to said portable data device when said device is inserted and connected in said rack.

DESCRIPTION OF THE PREFERRED EMBODIMENTS

Figure 1:
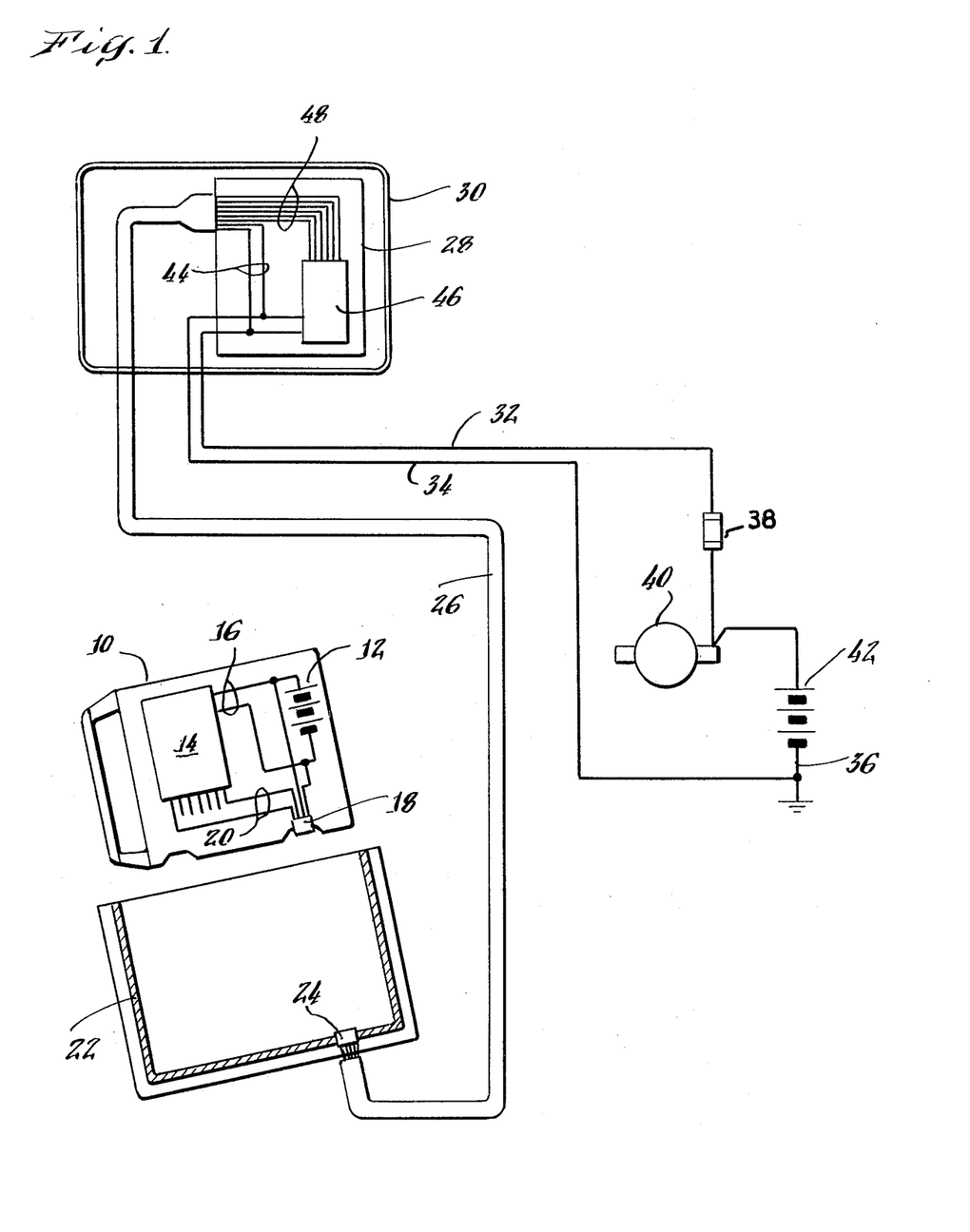
FIG. 1 is a schematic circuit diagram of a preferred embodiment of the invention.

Referring more particularly to the drawings, FIG. 1 is a schematic circuit diagram illustrating how the components of the system are connected together and are connected to the power system of the vehicle. A portable data entry and storage device is shown at 10. It includes a self-contained rechargeable battery power source 12 as well as the data function circuits 14. The self-contained rechargeable battery power source 12 is connected to the data function circuits 14 as indicated at 16. The rechargeable battery power source 12 is also connected to a quick-disconnect connector plug 18. About seven other connections are made from the data function circuits 14 to the quick-disconnect plug 18, as indicated at 20.

The portable data entry and storage device 10 may be hand-carried and operated independently of the vehicle in which it is intended to be mounted, and it is self-sufficient as far as the power supply is concerned by reason of the self-contained battery source 12 for a limited operating time.

A containing rack 22 is provided for the portable data device 10 and into which the data device can be slid in the same orientation as pictured in the drawing, so that when nested in the fully inserted position within the rack 22, the plug connector 18 mates with a matching quick-disconnect socket 24. By means of the socket 24, when connected in the rack 10, the data device can communicate through a multiple conductor cable 26 with a printer 28. The printer is mounted within an outer housing 30 having an open front. The printer includes a printing mechanism schematically shown at 46.

The printer 28 is connected by means of two conductors 32 and 34 to the power system of the vehicle in which the apparatus is intended to be installed. Connection 34 is simply a connection to ground at 36. Connection 32 is carried out through a fuse 38 to the battery terminal of the vehicle's starting solenoid 40, and thus to the positive terminal of the vehicle battery 42. The vehicle battery 42 is connected to receive power from the vehicle alternator (not shown).

Two of the conductors within the cable 26, the ones that are connectible to the power supply conductors to recharge the data device battery 12, are connected straight through the printer, as indicated at 44, to the conductors 32 and 34, and thus to the vehicle power system. Thus, the battery 12 of the data device is connected, for recharging, to the vehicle power system including battery 42 whenever the data device is fully inserted into the rack 22. The conductors 32 and 34 also provide power directly to the printer mechanism 46.

By means of the data connections through the cable 26 to the printer mechanism 46, as indicated at 48, the data device 10 may control the operation of the printer and provide data from the data device memories to be printed by the printer mechanism 46.

The system may be employed for a number of different purposes, including especially use on delivery truck vehicles for the delivery of merchandise such as oil or dairy products or bakery products. Ordering and sales information may be entered by the operator into the keyboard of the data device 10, and after all of that information is entered, device 10 may be inserted into the rack 22 so that it is connected through the connector 24 and the cable 26 to the printer 28. The data device 10 is preferably programmed so that, as soon as the connection is established at the connector recepticle 24, the resulting first signals to the printer 28 cause the printer to commence operation. Thus, it is not necessary normally to key further commands into the data device after the data device has been inserted into the rack 22.

The printer output in response to this operation may be used as a sales or consignment memorandum or invoice to be handed to the customer. Thus, it is not necessary for the operator to do any writing in order to enter the information, or in order to generate a written memorandum for the customer. The information contained in the memorandum supplied to the customer continues to be stored within the memories of the data device so that it can be read from the data device when the operator returns to his home office.

The data device 10 also preferably may contain prestored information about each customer when applied to a business having many repeat customers. Such data may include information such as quantities delivered previously. Such data also may be printed out on the printer, if desired, for the mutual assistance of the operator and the customer in determining present needs. This information is especially useful for a business such as bakery deliveries to grocery stores, where unsold goods which become stale must be returned, and where accurate prediction of inventory needs is very valuable.

The data device 10 may preferably be carried out in an embodiment similar to the devices disclosed in U.S. Pat. Nos. 3,942,157 and 4,016,542, respectively issued on Mar. 2, 1976 and Apr. 5, 1977 on inventions by Leo L. Azure and assigned to Azuredata, Inc. of Richland, Wash. Both of those patents relate to apparatus for data-gathering and formatting.

Figure 2:
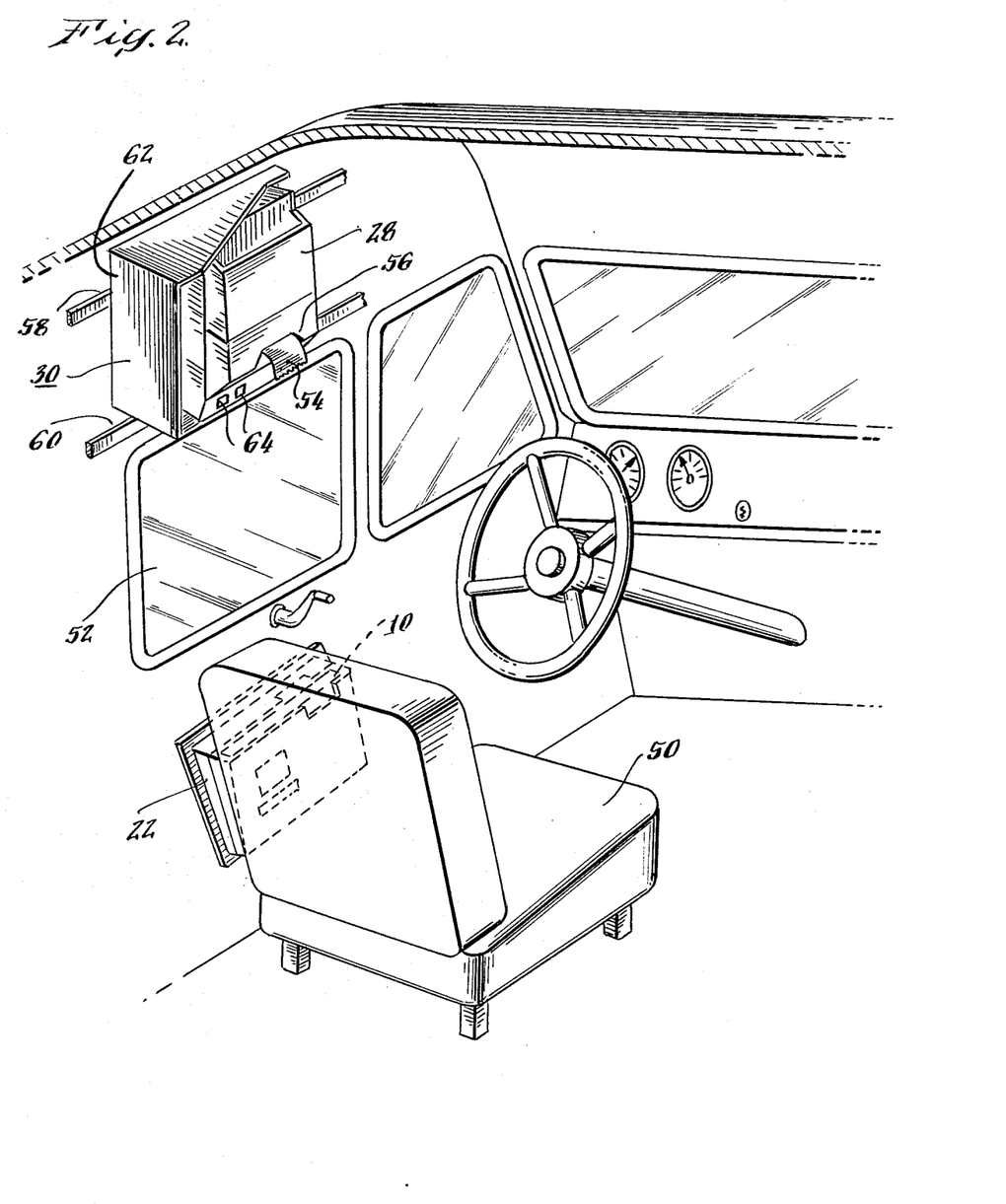
FIG. 2 is a perspective view of a part of the interior of a vehicle showing how the system of the invention is installed in the vehicle.

FIG. 2 is a perspective view of the inside of the driver's compartment of the vehicle in which the apparatus of the invention is intended to be installed, showing the preferred installed position of the apparatus. In particular, the rack 22 is shown installed on a side vertical wall of the vehicle next to the driver's seat and preferably rotated in a plane parallel to the wall by about 15°, thus placing one lower corner of the rack at a lower position than the other lower corner. The lowest corner, pictured on the left in the drawing, preferably includes a vent opening for draining any moisture from the rack which might accumulate because of rain or snow entering through the driver's window above the rack, or because of any condensation problem. The vent also permits the escape of any loose dirt particles.

As indicated in the drawing, the rack is preferably mounted just to the left of the driver's seat 50 and beneath the driver's left side window 52.

The portable data device 10 is preferably contained in a substantially flat rectilinear case which slides into a long narrow slot in the upper portion of the rack 22. While the flat sides of the data device case are substantially vertical, the cavity within the rack 22 is preferably tilted slightly outwardly towards the top and inwardly towards the bottom for greater ease and convenience in inserting the portable data device 10 into the rack. This arrangement is indicated in FIG. 2, and will be more clearly evident from the drawings and the description to follow.

The printer 28 is preferably mounted also upon a vertical side wall of the vehicle just above the driver's side window 52, as shown in FIG. 2. The printer is enclosed within a protective case, and emits a printed record on an endless paper strip 54 through a slotted opening 56.

The printer is mounted to the wall of the vehicle and protected by the printer housing 30 which includes means for direct fastening to horizontal frame members 58 and 60 within the truck body. As shown in the drawing, housing 30 includes a side wall portion 62 which is of substantially full depth to protect the printer from damage from merchandise which may be stored in the back of the vehicle and which may have to be moved from racks in the back of the vehicle through the driver's compartment. Further details of the printer housing are shown and described below in connection with other drawing figures. The printer also includes control and indicator buttons 64.

FIGS. 3, 4, 5, and 6 are drawings showing top, front, and side views of the printer 28 and the printer housing 30 and illustrating details of the construction of the printer and especially of the housing and the attachment of the printer to the housing and the attachment of the housing to the wall of the vehicle.

Figure 3:
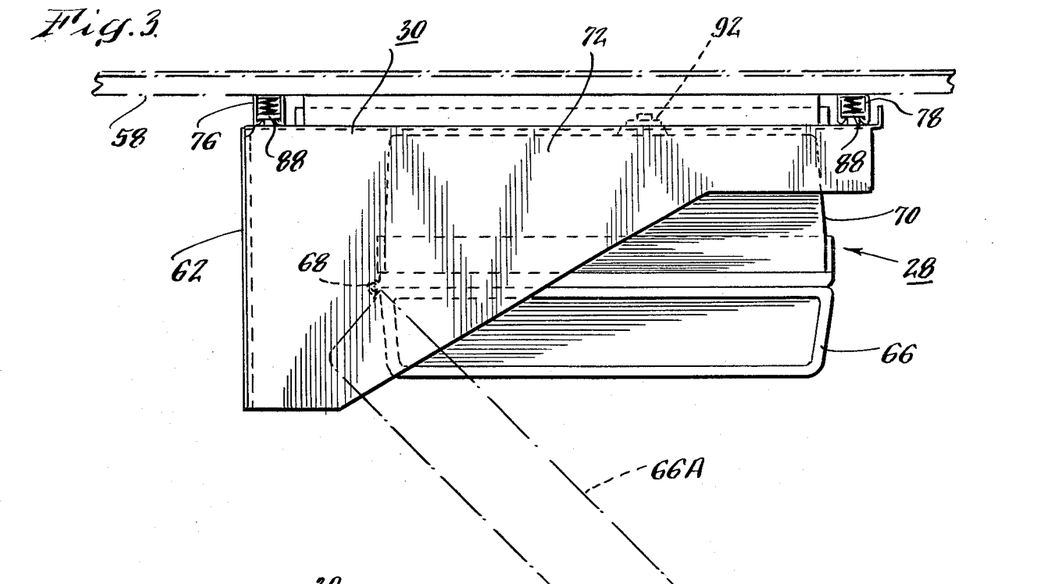
FIGS. 3, 4, 5, and 6 illustrate details of the housing and support for the printer which forms a part of the system of the invention.

Referring first to FIG. 3, which is the top view of the printer and the housing, the printer 28 and its enclosure are indicated as including a hinged cover 66 which is hingedly attached as by hinges 68, to a base cabinet 70. The housing 30 is somewhat wider than the enclosure of the printer, providing a substantial space between the inside of the left wall 62 of the housing and the outside of the left wall of the printer enclosure. This space permits swinging of the enclosure cover 66 when it is opened as indicated in phantom at 66A. The space also provides a safety factor in which the full depth wall 62 protects the printer from damage due to any merchandise or any other object which might bump or push the printer from the left. Thus, space is provided in which the protective wall 62 may be deformed without actually touching and damaging the printer cabinet.

As indicated in FIG. 3, the other side walls of the printer cabinet 30 are somewhat more shallow than the left wall 62. Thus, there is actually no wall at the right side of the printer and the top and bottom walls 72 and 74 are cut away in a tapered fashion to reinforce the left wall 62 on the left, and to provide some protection to the top and the bottom of the printer casing. The parts of the printer housing described thus far may be referred to as the body portion. In addition to the body portion, there are preferably provided two vertical rails 76 and 78 which are preferably vertically adjustable in relation to the body portion to span across at least two horizontal frame members in the wall of the body of the vehicle to which the printer is to be attached. The vehicle is usually a truck, and is sometimes referred to as a truck in this specification. The body portion of the printer housing is then vertically adjustable upon the vertical rails to the desired height. The horizontal frame members in the wall of the body of the truck were previously referred to in connection with FIG. 2 and are shown in phantom at 58 and 60. Horizontal frame member 60 is illustrated in FIG. 4.

Figure 4:
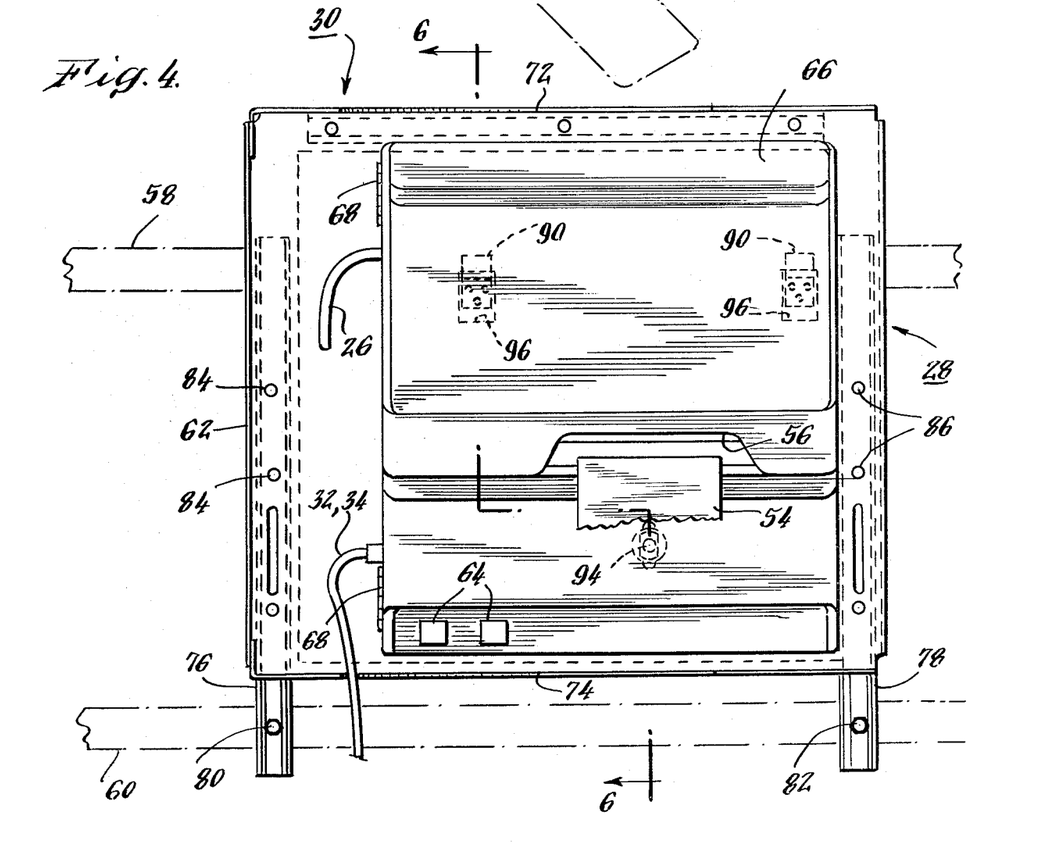

FIG. 4 is a front view of the printer 28 and the housing 30 which shows especially how the rails 76 and 78 are adjustable relative to the body portion of the housing. In FIG. 4, the horizontal frame members 58 and 60 are shown as positioned somewhat below the desired position of the housing 30 and the printer 28 on the inside wall of the truck. In order to provide a solid mounting for the housing 30 and the printer 28, the vertical rails 76 and 78 are adjustable downwardly and secured through the wall of the vehicle to the frame member 60 by means of bolts or cap screws 80 and 82. The upper portions of the rails 76 and 78 are similarly attached to the vehicle frame member 58. The body portion of the cabinet 30 is then adjusted vertically to the desired position, and locked in vertical position upon the rails 76 and 78 by tightening the spaced screw-threaded fastenings shown at 84 and 86. The rails 76 and 78 preferably have a "U" shape, with the open side of the "U" facing towards the body portion of the cabinet and with special nuts 88 confined within the "U" shaped rails cooperating with the screw fastenings 84 and 86, as partially illustrated in FIG. 3. Springs may be provided to keep the special nuts 88 in place within the rails 76 and 78.

Figures 5, 6:
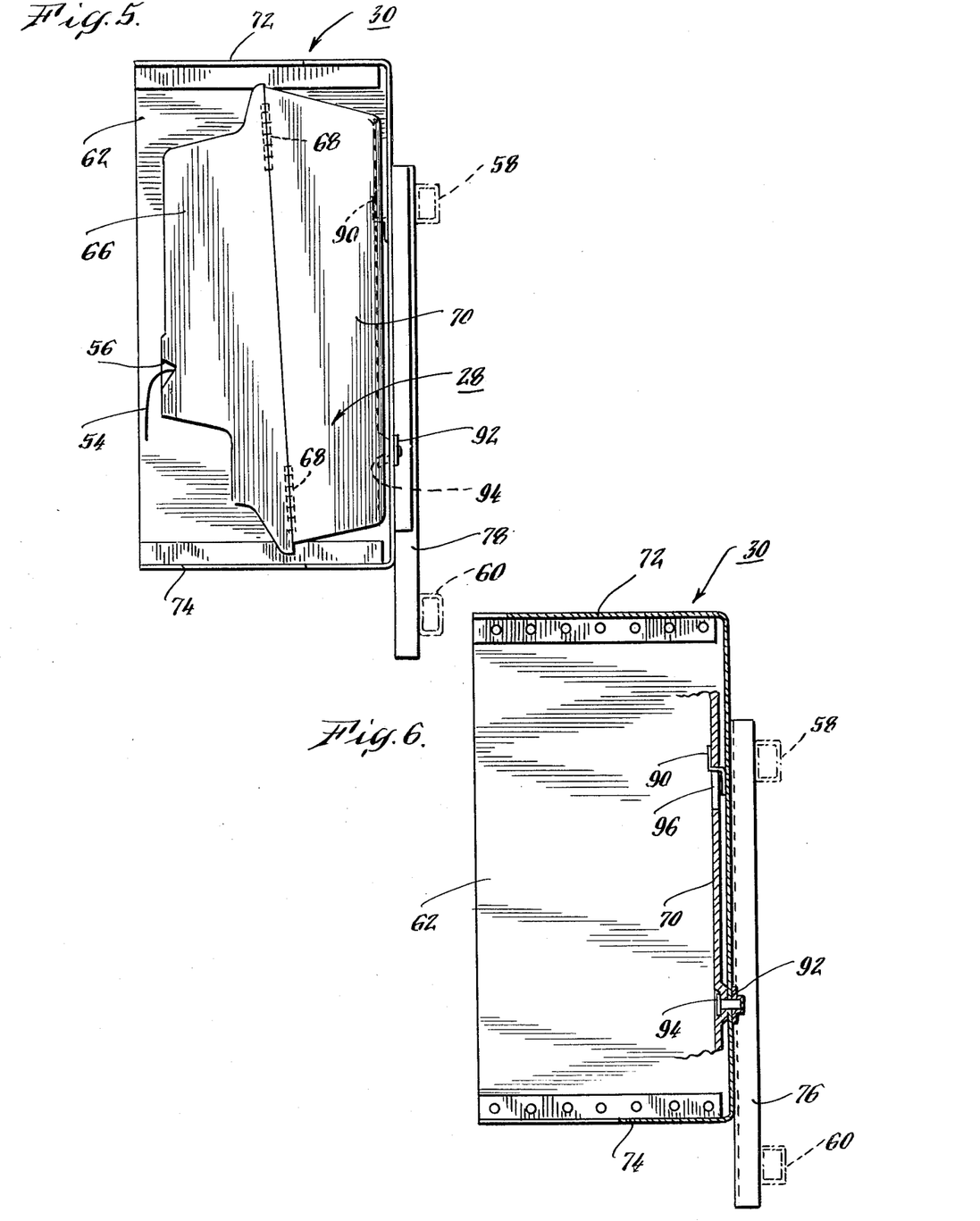

FIG. 5 is a right side view of the combination of the printer 28 and the housing 30, and again showing the arrangement of the mounting rails 76 and 78 in relationship to the horizontal vehicle body frame members 58 and 60, and in relation to the body portion of the housing 30.

FIG. 6 is a sectional right side view taken at section 6—6 of FIG. 4 and showing the housing 30 and just a portion of the back wall of the printer base cabinet 70. FIG. 6 especially shows the preferred means by which the printer is attached and secured to the housing 30. This means includes two hook members 90 which are attached to the upper portion of the back wall of the housing 30, and a fitting 92 which is arranged to receive a rotary fastening 94 in the back wall 70 of the printer case.

In order to mount the printer within the housing, the printer is moved back so that the hooks enter openings 96 in the back wall 70 of the printer case, and then the printer is moved downwardly over the hooks 90 so that the threaded-fastening 94 is in line with the fitting 92, at which time 94 is attached to 92, thus securing the printer to the housing 30. The hooks 90, the openings 96, and the fastening 94 are illustrated again in FIG. 4 and FIG. 5, and the fitting 92 is illustrated in FIG. 3 and in FIG. 5.

FIGS. 7 and 9 through 12 illustrate the details of construction of a preferred embodiment of the rack 22 previously illustrated in FIG. 1 and FIG. 2 for holding and containing a portable data device. FIG. 8 reveals the configuration of the preferred form of the case of the portable data device.

Figure 7:
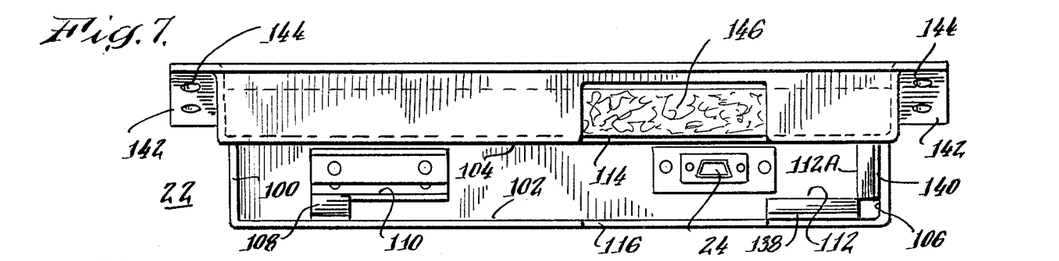
FIGS. 7, 8, 9, 10, 11, and 12 illustrate details of the construction of a rack for containing and supporting a portable data device, as well as the portable data device, which form parts of the system.
Figure 8:
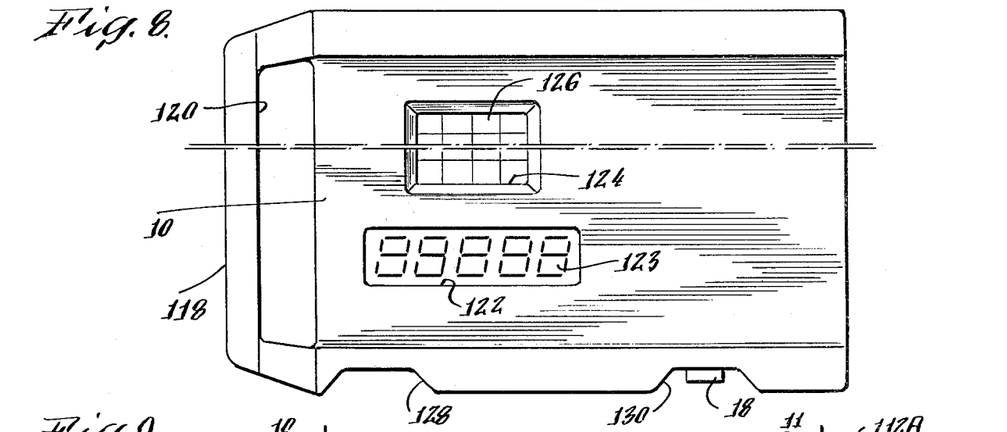

FIG. 7 is a top view of the rack 22 looking downwardly upon the rack at a slight angle and straight into the cavity of the rack for receiving the portable data device. The cavity within the rack 22 for receiving the portable data device is defined by the inner walls 100, 102, 104, and 106. Within the cavity 100;14 106, there are provided guide members 108, 110, and 112. These guide members are preferably all adjustable in order to provide for a precise fit of the portable data device within the cavity. Thus, guide members 108 and 110 are preferably adjustable inwardly towards the cavity wall 104 to confine the case of the portable data device snugly against cavity wall 104 at the left side of the drawing when the portable data device is inserted all the way into the cavity. Similarly, the guide 112 is adjustable by means of spacing shims 114 shown in FIG. 11, to be as close as desired to wall 104 in order to provide a snug fit of the portable data device against wall 104 at the right side of the device. The guide 112 has an "L" shaped cross section, having a leg 112A. The guide 112 is also adjustable to the left and to the right in order to move leg 112A to provide a snug fit of the portable data device case between guide leg 112A and the opposite wall 100 of the cavity.

Precise spacing and positioning of the case of the portable data device is especially desired in order to establish a connection of the connector 18 on the edge of the data device to the connector 24 in the bottom of the cavity 100–106.

As further illustrated in FIG. 7, there are preferably cut out portions in the walls of the cavity 100–106, as illustrated at 114 and 116 in order to better enable the operator to grasp the edge of the portable data device case for ease of removal from the rack.

Figure 9:
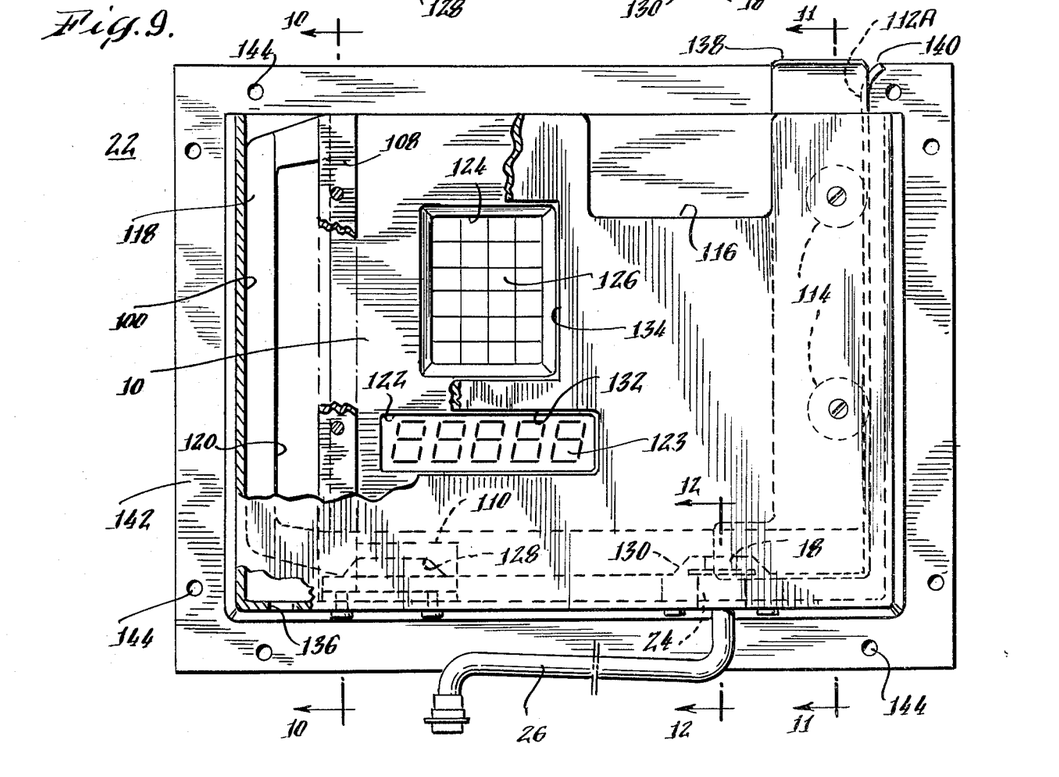

The preferred configuration of the portable data device case is illustrated in a front view in FIG. 8 in conjunction with FIG. 9, which is a front view, partly in section, of the rack 22 illustrated in FIG. 7. The portable data device is shown in FIG. 8 in the position for insertion into the rack as illustrated in FIG. 9. The data device 10 is then shown again within the rack 22.

In FIG. 8, the portable data device 10 is shown slightly foreshortened in the vertical dimension. However, the true dimensions are evident from the representation of the full vertical size of the device in FIG. 9 where the portable data device 10 is shown assembled into the rack 22.

Referring again to FIG. 8, the portable data device case is seen to include a handle portion 118 formed with a through opening 120. The case also includes a window at 122 for a visual data display 123 employing the usual light-emitting diodes or liquid crystal display.

Another window is provided at 124 for an operating keyboard 126. Two small indentations 128 and 130 are provided in one edge of the portable data device case, and the quick-disconnect connector part 18 is arranged in the indentation 130, where it is protected from mechanical damage.

FIG. 9 is a front view of the rack 22 of FIG. 7, shown partly in section, and showing the portable data device 10 assembled in the rack. The rack itself preferably includes windows 132 and 134 for the digital display 123 and the keyboard 126 respectively. The windows 132 and 134 in the rack 22 permit access by the operator to the display 123 and the keyboard 126 of the portable data device while the device is housed within the rack. Thus, the data device can be operated to provide a display of data, or to transmit data to the printer while the data device is in the assembled position.

At least one drain opening 136 is preferably provided in the lower left hand corner of the rack to drain any moisture or dirt from the cavity. The embodiment of the rack illustrated in FIG. 9 is preferably mounted in the vehicle with about a 15° tilt so that the lower edge of the rack makes an angle of about 15° with the horizontal, with the lower left corner being lower than the lower right corner. Thus, the opening 136 is at the lowest point of the cavity, and purposely at the side of the cavity opposite to the side where the electrical connectors 18 and 24 are positioned, so that moisture will drain quickly away from the connectors.

As shown especially in FIG. 9, the upper ends of the guide member 112 are outwardly flared, as shown at 138 and 140. The rack is provided with a base flange 142 which preferably extends around the entire periphery of the rack, and which includes spaced-mounting bolt-holes 144.

Figure 10:
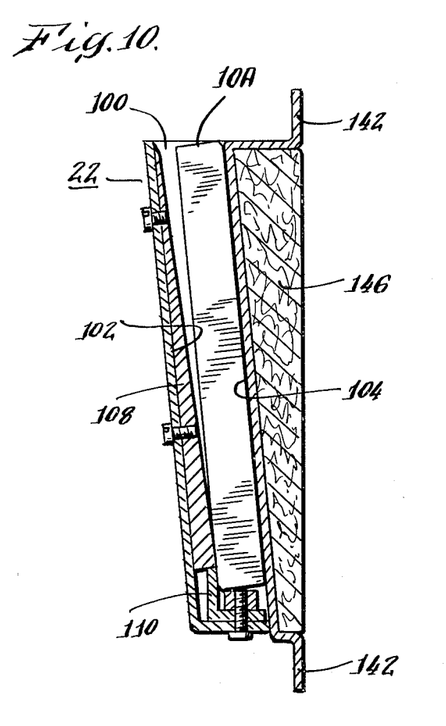

FIG. 10 is a sectional side view of the embodiment of FIG. 9 of the rack 22 taken at section 10—10 of FIG. 9. The portable data device 10 is shown in phantom in the installed position at 10A within the rack. As shown especially in FIG. 10, the portable data device 10A is relatively flat, having a narrow horizontal dimension in the installed position illustrated in FIG. 10. In a preferred physical embodiment, this dimension is considerably narrower than illustrated in the drawing, a somewhat wider dimension being illustrated in order to provide greater clarity in the drawings.

As shown in FIG. 10, the guide 108 is preferably uniformly tapered from the top to the bottom in order to provide ease of insertion of the portable data device while accomplishing a snug fit of the device against the back wall 104 when the device is fully inserted.

The body of the rack is preferably formed, as shown, with a cavity in the back of the rack between the upper and lower portions of the flange 142. Within that cavity a thermal insulation 146 is preferably provided in order to insulate the portable data device from heat transmitted from the wall of the vehicle to the rack 22. The insulation may be of any appropriate material such as a plastic foam, and preferably has a minimum thickness of at least one-half inch.

Figure 11:
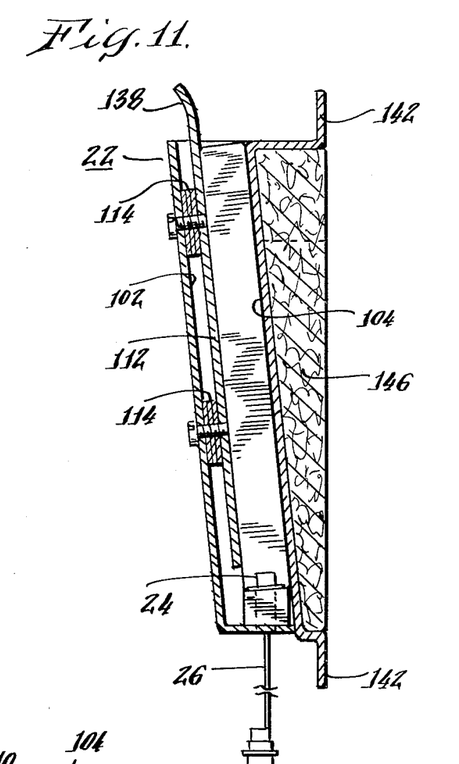

FIG. 11 is another sectional side view taken at section 11—11 of FIG. 9 and showing the arrangement of the guide 112, and how the guide 112 is mounted with shims 114 to provide an adjustable fit of the portable data device 10 within the cavity formed by the rack 22. The quick-disconnect connector part 24 is illustrated at the bottom of the cavity in FIG. 11.

Figure 12:
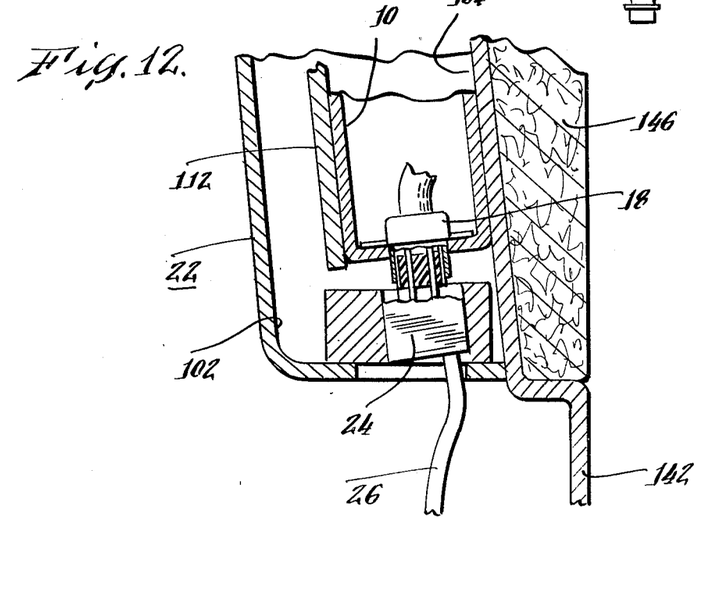

FIG. 12 is an enlarged sectional detail view of the bottom portion if the structure illustrated in FIG. 11, and showing the bottom edge of the case of the portable data device 10 with the quick-disconnect connector part 18 mating with the quick-disconnect connector part 24 of the rack. This drawing illustrates how the guide 112 precisely positions the bottom edge of the portable data device 10 in order to assure proper coupling of the quick-disconnect connector parts.

FIGS. 13 through 17 illustrate an alternative embodiment 22B of the rack for the portable data device and a slightly modified embodiment 10B of the portable data device.

Figures 13, 15:
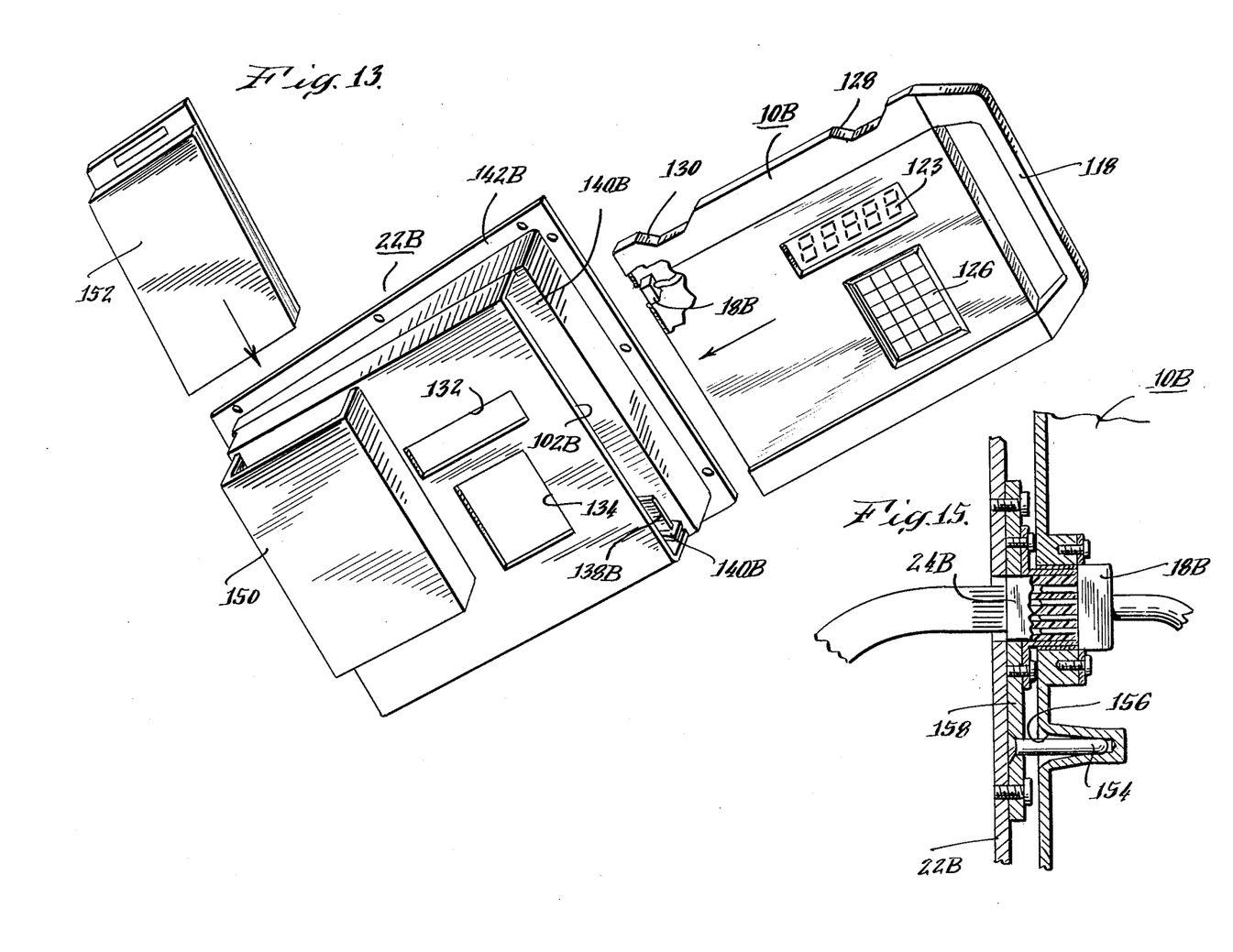
FIGS. 13, 14, 15, 16, and 17 illustrate an alternative embodiment of the rack for the portable data device and an alternative embodiment of the portable data device.

FIG. 13 is a perspective view of the alternative embodiment 22B of the rack for the portable data device together with a modified embodiment 10B of the portable data device illustrated in a position in which it is about to be inserted into the cavity of rack 22B. The rack 22B is illustrated in FIG. 13 at an angle of about 30° from the horizontal, which is the preferred orientation for mounting upon the wall of the vehicle. This places the opening of the rack cavity towards the upper part of the rack and provides for retention of the portable data device 10B within the rack by gravity force. One major advantage of the configuration of FIG. 13 is that the handle portion 118 of the data device is at the opening of the cavity in the rack 22B when the data device is fully inserted into the cavity. This provides for ease of removal. Another major advantage is that the data display 123 is above the keyboard 126 when the data device is inserted into the rack, a more normal arrangement since the hand of the operator, when operating the keyboard 126, does not obscure the data display 123.

The only structural difference in the data service 10B from the previously described data device 10 is that the quick-disconnect connector part 18 has been removed from the notched portion 130 and has been placed in the end wall of the data device case opposite the handle 118, as shown at 18B.

An optional additional feature of the rack 22B is the provision of a pocket 150 to receive a conventional bill pad or notebook 152 for recording information in addition to that which can be recorded by the data device.

Figure 14:
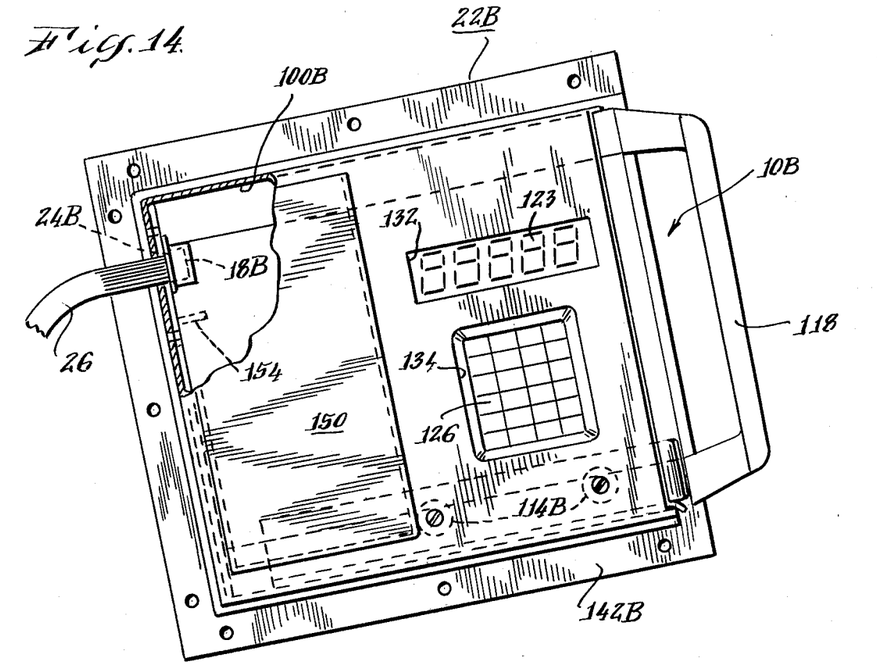

FIG. 14 is a front view, partly in section, showing the rack 22B of FIG. 13 with the data device 10B fully inserted into the cavity of the rack. The sectioned part of the drawing shows the arrangement and positions of the quick-disconnect connectors 18B in the data device and 24B in the rack. Again, guide members are provided within the cavity of the rack 22B in order to precisely position the data device within the rack in order to establish the correct registration of the quick-disconnect connector parts 18B and 24B. Additionally, in this embodiment, there may be optionally provided a positioning pin 154 in the cavity of the rack which engages an opening in the associated portion of the case of the data device 10B for precise final positioning and registration of the quick-disconnect connector parts 18B and 24B just before they engage one another. Preferably, the opening in the case of the portable data device is tapered in order to provide for slight initial mis-alignment. This portion of the structure illustrated in FIG. 14 is shown in enlarged detail in FIG. 15.

FIG. 15 is an enlarged detail, in section, of the portion of the structure illustrated in FIG. 14 showing the optional feature of a positioning device consisting of a positioning pin 154 attached in the bottom of the cavity of the rack 22B and a cooperating tapered opening 156 provided in the associated edge of the portable data device 10B. As indicated in FIG. 15, positioning pin 154 is preferably attached to the bottom wall of the rack cavity by means of a mounting plate 158 which is a common mounting plate which also holds the quick-disconnect connector socket part 24B. Thus, these two parts are precisely spaced with respect to one another by reason of the common mounting plate 158. This is important because the pin 154 is for the purpose of establishing precise registration of the two quick-disconnect connector parts.

Figure 16:
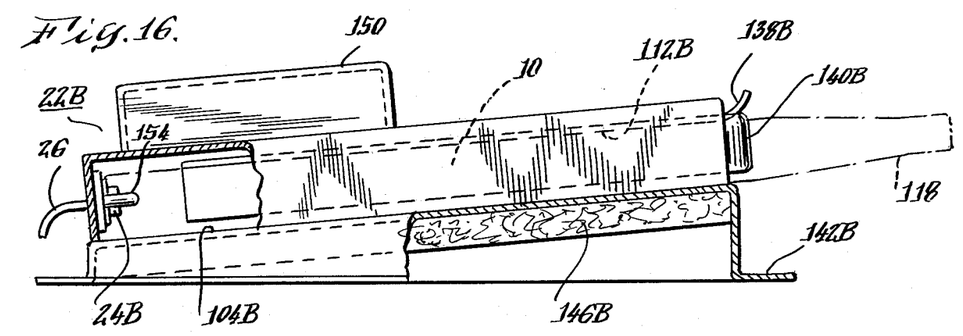

To further exemplify this embodiment, FIG. 16 is a bottom view of the rack of FIG. 13, partly in section, and showing the portable data device in a position which is almost fully inserted into the cavity. FIG. 16 also shows that insulation is again preferably provided at 146B in the back cavity of the rack.

Figure 17:
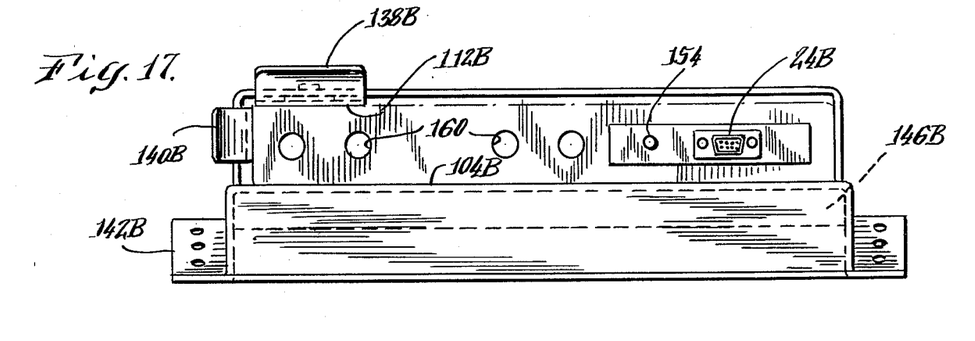

FIG. 17 is a view of the rack 22B of FIG. 13 looking directly into the slotted opening of the cavity and further revealing the arrangement of the positioning pin 154 and the connector 24B at the innermost wall of the rack. As indicated at 160, openings are preferably provided in that far wall of the rack for ventilation.

The positioning pin 154 and the tapered opening 156 illustrated and described above in connection with FIGS. 14–17 represent an optional feature which may be incorporated in the rack embodiment of the FIGS. 13–17. Alternatively, reliance may be placed entirely upon the adjustable guides for accurate positioning of the data device 10B within the cavity. Similarly, the positioning pin 154 and associated tapered cavity 156 may be incorporated into the embodiment of FIGS. 7–12, or in the embodiment of FIGS. 18–21, is desired.

Figure 18:
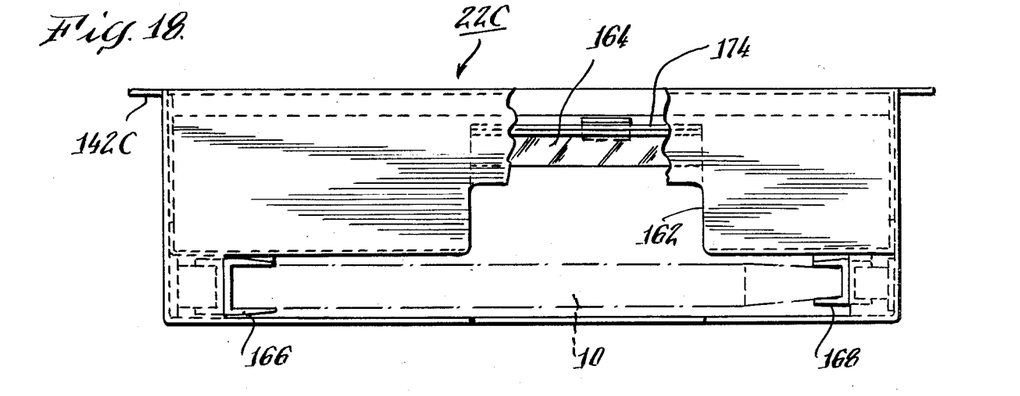
FIGS. 18, 19, 20, and 21 illustrate the construction and details of another alternative embodiment of the rack for the portable data device.

FIGS. 18, 19, 20, and 21 illustrate still another alternative embodiment 22C of the rack of the invention. FIG. 18 is a top view of the rack which accommodates the data device.

Figure 19:
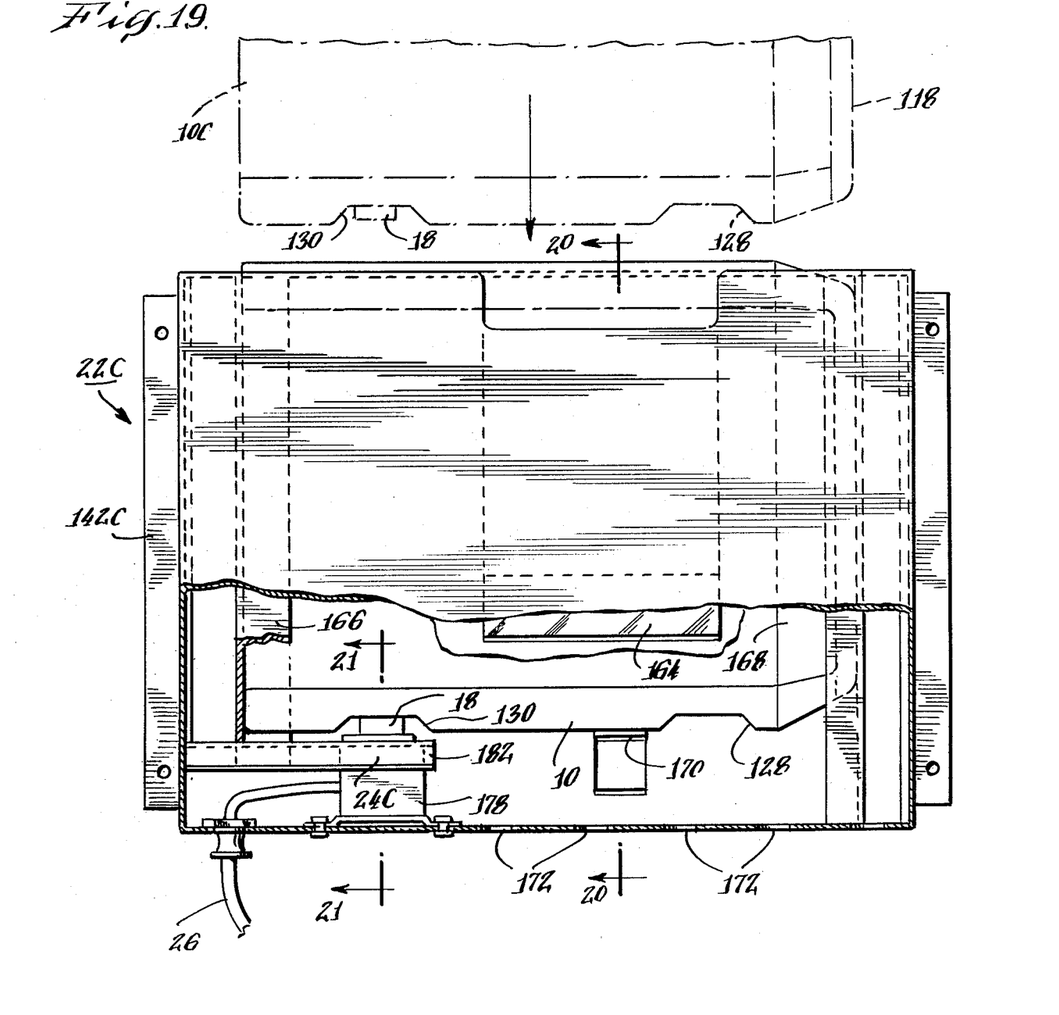

FIG. 19 is a front view of the rack showing a partial view of the data device 10 at 10C in phantom, about to be inserted, and also showing the data device in the inserted and assembled position.

Figure 20:
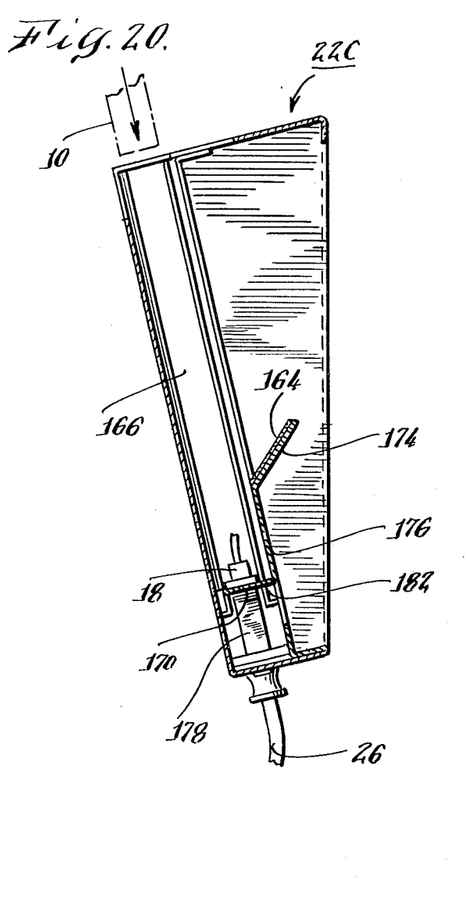

Additionally, FIG. 20 is asectional sideview of the rack 22C taken at section 20—20 in FIG. 19.

Figure 21:
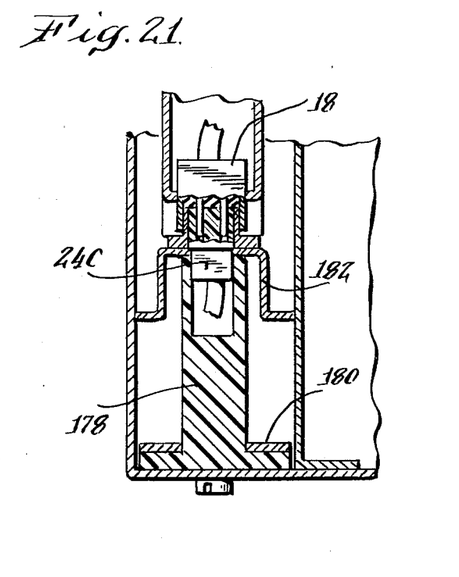

FIG. 21 is a sectional side detail view taken at section 21—21 of FIG. 19 and containing an enlarged representation of the details of the quick-disconnect connector structure.

The portable data device 10 illustrated in FIG. 18-21 is exactly the same as that shown in FIG. 8. One of the main differences between the embodiment of FIGS. 7–12 and the embodiment of FIGS. 18–21 is that in the embodiment of FIGS. 18–21 the portable data device is to be inserted with the operating keyboard 126 and the data display 123 positioned in the back of the rack and viewable by means of a window opening 162 and a reflective mirror 164 arranged adjacent to the rack cavity. This arrangement has the major advantage that the keyboard 126 and the display 123 are not exposed to being accidentally bumped and damaged by the operator.

As illustrated particularly in the top view of FIG. 18, in the rack 22C, "U" shaped guide members 166 and 168 are preferably provided for guiding the data device 10, shown in phantom in FIG. 18, into the cavity. The "U" shaped guide members 166 and 168 are preferably semi-rigid extrusions of a synthetic resin material such as vinyl, and are precisely positioned within the end portions of the cavity to guide the portable data device 10 accurately into the cavity and to provide for accurate registration of the quick-disconnect connectors 18 and 24C.

As illustrated in FIG. 19, which is partly in section, a stop bracket 170 is provided at the bottom of the cavity to provide for a limit to the inward motion of the portable data device 10 as it is inserted into the rack 22C. The downward motion of the data device is also limited by the engagement of the connectors 18 and 24C. The bottom of the cavity of the rack 22C is otherwise essentially open, except for the stop bracket 170 and the connector 24C, to permit the circulation of air around the portable data device. In order to promote the circulation of air to provide for cooling, and to keep the rack dry and clean, a series of openings is preferably provided in the bottom of the rack, as indicated at 172.

As shown in FIG. 20, the reflector or mirror 164 may be attached to and supported upon a bracket 174 which is attached to and forms an integral part of an inside wall 176 of the rack 22C.

The mirror 164 may be provided by simply attaching a pressure sensitive adhesive coated reflective metal foil to the upper surface of the support bracket 174.

If desired, thermal insulation may again be provided in the back of the rack 22C. However, another approach is to simply provide air space, and ventilation through the cavity by means of the openings 172 shown in FIG. 19.

FIG. 21, is an enlarged detail side view taken at Section 21—21 of FIG. 19. In this drawing, a pedestal 178 is shown to support the quick-disconnect connector 24C. The pedestal is mounted and retained by a bracket 180, and carries an uppoer partition member 182.

The embodiment of FIGS. 18–21 is especially adapted for construction in sheet metal. The other embodiments of the rack are especially adapted for fabrication in molded plastic.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. A mobile business data handling system adapted to be mounted in a motor vehicle for use with a portable data entry and storage device for gathering and storing data, comprising a containing rack defining a cavity for removably accepting said portable data device, wherein said rack is adapted to be attached inside said vehicle, said portable data device is insertable into said rack cavity to an inserted position, said rack has a quick-disconnect connector within said rack cavity for automatic connection of said connector with a mating connector on said portable data device when said portable data device is in said inserted position in said rack cavity, said quick-disconnect connector in said rack cavity is arranged for connection to the vehicle power system to supply power to said portable data device and for connection to a data printer to receive and print data from said portable data device when said device is in said inserted position in said rack cavity, and said rack cavity has guide means therein for positioning said portable data device in said rack cavity to align the connector on said portable data device with said quick-disconnect connector in said rack cavity to assure automatic mating and connection of said connectors when said portable data device is in said inserted position in said rack cavity.

2. A mobile data system as claimed in claim 1 wherein said portable data device is enclosed within a substantially flat rectilinear case, and said rack is adapted too be attached to a vertical side wall of said vehicle and is arranged to receive said portable data device through a long narrow opening which accommodates one of the narrow edges of said portable data device case, said narrow opening defines the opening of said cavity, said rack is arranged on said vehicle with said narrow opening being positioned in an upper portion of said rack, and said guide means includes guides for said data device case extending downwardly from said opening into said cavity to hold said case in a position with the flat sides of said data device case substantially vertical.

3. A mobile data system as claimed in claim 2 wherein said guides and said cavity within said rack are tilted slightly outwardly towards the top and inwardly towards the bottom for greater ease and convenience in inserting said portable data device into said rack.

4. A mobile data system as claimed in claim 3 wherein said guides comprise adjustable guide rails arranged within said cavity for guiding the case of said portable data device.

5. A mobile data system as claimed in claim 3 wherein said guide means includes separate interengaging alignment members respectively positioned in the bottom of the cavity of said rack and at the associated edge portion of said portable data device case and positioned near the positions of said mating quick-disconnect connectors, one of said alignment members comprising a pin and the other one of said alignment members comprising a tapered cavity to receive said pin.

6. A system as claimed in claim 2 wherein said rack includes a layer of thermal insulation arranged between said cavity portion and the portion of said rack which is to be attached directly to the side wall of said vehicle to thus provide for thermal isolation of said portable data device from heat transmitted through the side wall of the vehicle.

7. A mobile data system as claimed in claim 2 wherein said portable data device includes a keyboard and a data display on one flat side thereof, and wherein said rack includes at least one window opening extending into said cavity to permit access to the data display and keyboard of said portable data device while said data device is inserted in said rack.

8. A mobile data system as claimed in claim 7 wherein said window opens through the rack surface opposite to the side of said rack which is to be attached to the side wall of the vehicle.

9. A system as claimed in claim 1 including a data printer arranged for connection to said portable data device through said mating connectors when said portable data device is in said inserted position in said rack cavity to receive data and to print data supplied from said portable data device, said printer including connection means for connection to the power system of the vehicle to energize said printer, and a mounting means for mounting said printer on said vehicle.

10. A system as claimed in claim 9 wherein said mounting means comprises a printer housing having a back portion arranged to be fastened to a wall of the vehicle and to which the printer is attached, said printer housing including side wall portions at least partially surrounding the peripheral edges of said printer to protect said printer from mechanical damage from moving objects within the vehicle.

11. A system as claimed in claim 10 wherein said printer and said printer housing are intended to be mounted on the left side wall in the driver's compartment of a delivery truck, and wherein the left peripheral side wall of said mounting housing is of full depth to completely protect and shield the left side of said printer from any load which may shift forward into the driver's compartment of said truck.

12. A system as claimed in claim 11 wherein said printer housing includes a body portion and two vertical rails for supporting said body portion, said rails being vertically adjustable to span across at least two horizontal frame members in the wall of the body of the truck to which the printer is to be attached, said body portion of said printer housing then being vertically adjustable upon said vertical rails to the desired height.

* * * * *